United States Patent
Tadepally et al.

(10) Patent No.: US 11,880,346 B2
(45) Date of Patent: Jan. 23, 2024

(54) SMART DATA QUALITY PROTOCOLS

(71) Applicant: Bank of America Corporation, Charlotte, NC (US)

(72) Inventors: Ravikanth Tadepally, Hyderabad (IN); Suki Ramasamy, Chennai (IN); Mohan Sundaresan, Secunderabad (IN)

(73) Assignee: Bank of America Corporation, Charlotte, NC (US)

( * ) Notice: Subject to any disclaimer, the term of this patent is extended or adjusted under 35 U.S.C. 154(b) by 39 days.

(21) Appl. No.: 17/241,144

(22) Filed: Apr. 27, 2021

(65) Prior Publication Data
US 2022/0342862 A1    Oct. 27, 2022

(51) Int. Cl.
*G06F 16/215* (2019.01)
*G06F 16/28* (2019.01)
*G06N 5/04* (2023.01)
*G06N 20/00* (2019.01)
*G06F 16/25* (2019.01)

(52) U.S. Cl.
CPC .......... *G06F 16/215* (2019.01); *G06F 16/254* (2019.01); *G06F 16/285* (2019.01); *G06N 5/04* (2013.01); *G06N 20/00* (2019.01)

(58) Field of Classification Search
CPC .... G06F 16/215; G06F 16/285; G06F 16/254; G06N 20/00; G06N 5/04
See application file for complete search history.

(56) References Cited

U.S. PATENT DOCUMENTS

| | | | |
|---|---|---|---|
| 11,120,364 B1* | 9/2021 | Gokalp | G06N 20/00 |
| 2014/0279756 A1* | 9/2014 | Whitman | G06N 20/10 |
| | | | 707/771 |
| 2018/0053096 A1* | 2/2018 | Farrell | G06F 16/9024 |
| 2019/0251593 A1* | 8/2019 | Allouche | G06Q 10/0639 |
| 2020/0394455 A1* | 12/2020 | Lee | G06Q 40/08 |
| 2021/0149671 A1* | 5/2021 | Sar Shalom | G06N 5/022 |
| 2022/0156175 A1* | 5/2022 | Periyathambi | G06F 40/20 |

* cited by examiner

*Primary Examiner* — Mariela Reyes
*Assistant Examiner* — Courtney Harmon
(74) *Attorney, Agent, or Firm* — Weiss & Arons LLP

(57) ABSTRACT

Systems, methods and apparatus are provided for AI-based generation of data warehouse quality protocols. An attribute classifier may quantify relationships between source data and target data from an enterprise data warehouse. A data quality engine may apply these relationships to identify specific data quality concerns and generate customized data quality metrics.

18 Claims, 6 Drawing Sheets

SMART DATA QUALITY PROTOCOLS

FIELD OF TECHNOLOGY

Aspects of the disclosure relate to protocols for AI-based data warehouse quality management.

BACKGROUND OF THE DISCLOSURE

Data quality management is crucial for a wide range of business intelligence functions such as reporting, analytical processing, performance management, benchmarking and predictive analytics.

Business intelligence systems integrate data from a variety of heterogenous data sources. Data warehouse protocols process and store source data in a proprietary structured format.

Data quality management may ensure the reliability of the data warehouse. Data stored in the data warehouse may be subject to different data quality metrics based on the type of data and the parameters for the operations on the source data, but it can be difficult or impossible to manually capture these distinctions. The complexities of integrating upstream and downstream components with different data structures also make it difficult to define automated data quality protocols with the flexibility to address unique system architectures.

It would be desirable to use AI methods to quantify the relationships between heterogenous source data and structured target data. It would be desirable to apply these relationships to identify specific data quality concerns and generate customized data quality metrics. This data-agnostic approach would be uniformly applicable, but the incorporation of both source attributes and target attributes from a given system would uniquely customize the protocols for individual system architectures.

SUMMARY OF THE DISCLOSURE

Systems, methods, and apparatus for smart data quality protocols are provided.

A set of source attributes may be obtained from a data source. The source attributes may include unstructured, semi-structured or structured data. A set of target attributes may be obtained from a data warehouse. The target attributes may include structured enterprise data.

An attribute classifier may generate a source vector from each attribute in the set of source attributes. The attribute classifier may generate a target vector from each target attribute in the set of target attributes. The attribute classifier may determine a probability of correspondence between a source vector and each of the target vectors.

A data quality engine may classify a source attribute based at least in part on the probability of correspondence between the source vector generated from the source attribute and a target vector. The data quality engine may classify a target attribute based at least in part on a probability of correspondence between a source vector and the target vector. The data quality engine may generate data quality metrics for the source attributes and the target attributes based on the classifications. The data quality engine may validate the source data and the target data using the data quality metrics.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
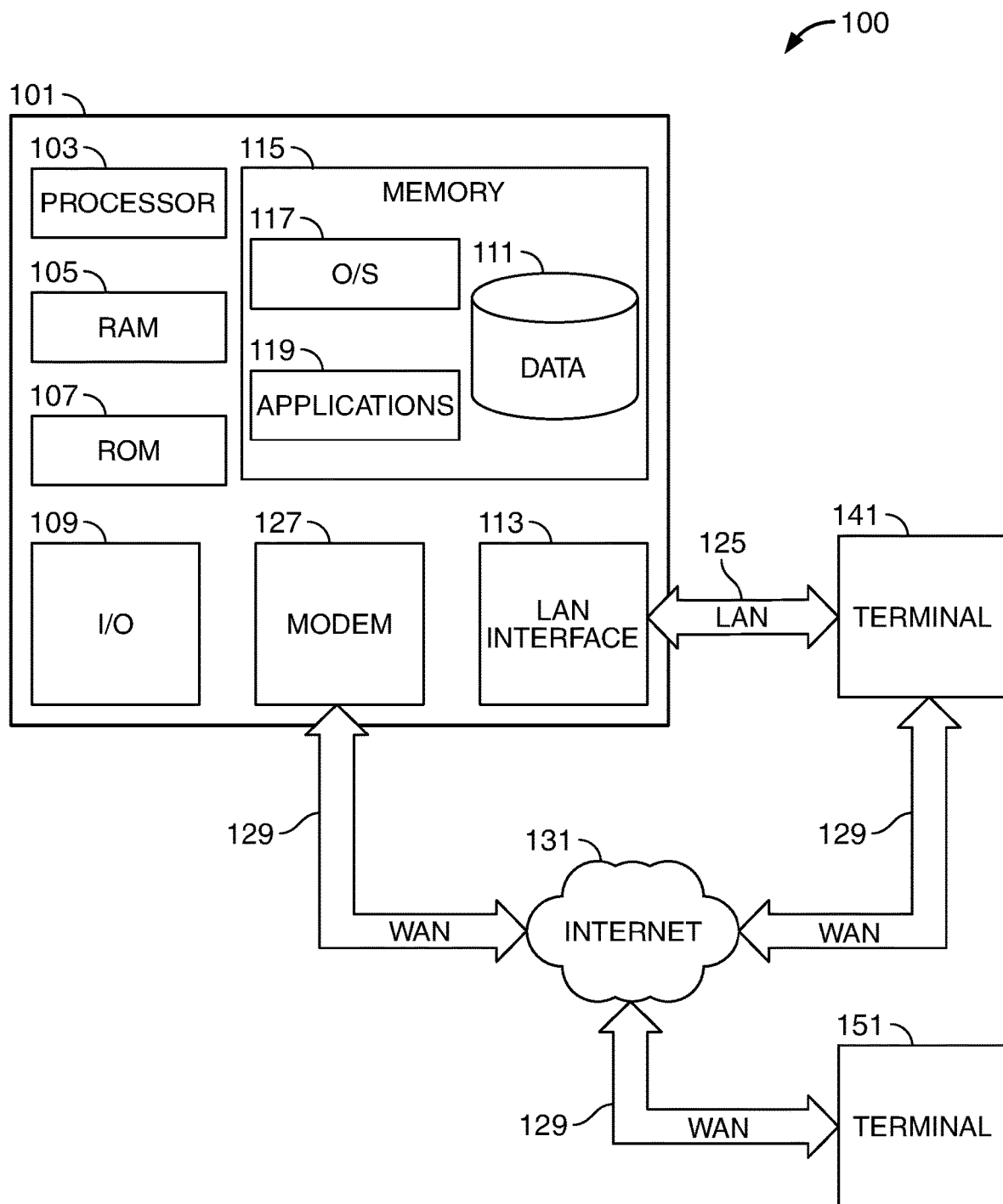
FIG. 1 shows illustrative apparatus in accordance with principles of the disclosure.

Systems, methods and apparatus for smart data quality protocols are provided.

Business intelligence (BI) may be defined as a set of tools and protocols for the transformation of raw data into meaningful and useful information for business analysis purposes. A BI system may combine data warehousing and decision support systems.

BI systems obtain data from a variety of heterogenous data sources. These disparate upstream systems may include SQL databases, non-SQL databases, message queues and websites. Source data may be structured, semi-structured or non-structured. A data warehouse functions as a centralized repository that integrates data from these different source formats.

Data warehouses are typically built using either extract, transform, load (ETL) or extract, load, transform (ELT) tools.

In an ETL-based data warehouse, a staging layer stores raw data extracted from each of the disparate source data systems. An integration layer integrates the disparate data sets by transforming the data from the staging layer. The integrated data is arranged into facts and hierarchical groups of dimensions.

Facts may be defined as quantitative values or measurements and are subject to aggregation. Dimensions may be qualitative and descriptive and may provide information related to a fact. For example, in the case of transaction data, a fact column may include purchase amounts and a dimension column may include identifiers for customers associated with the purchases.

In a relational database, primary and foreign key attributes in the fact and dimension tables include identifiers that establish relationships between tables. Primary and foreign key attributes may be subject to different data quality metrics.

ELT-based data warehousing does not typically use a separate tool for transformation. Instead, an ELT based system maintains a staging area inside the data warehouse itself. Data is extracted from heterogeneous source systems and then directly loaded into the data warehouse, before any transformation occurs. Transformations are then handled inside the data warehouse itself and the transformed data is loaded into target tables.

Source data integrated into a data warehouse may require additional operations to ensure data quality before it is suitable for business intelligence operations.

Conventionally, data quality tools require manual input to identify relevant metrics. Existing processes for capturing data quality metrics are not easily adapted to the complexity of BI architectures with numerous upstream and downstream systems. AI-based attribute classification may be applied to overcome these challenges. By developing quantified relationships between the source data and the target data, the disparate sources may be harnessed to the target data to inform data quality management protocols for both the source data and the target data.

AI-based solutions may include automated generation of data quality metrics that may be applied to both the source data and target data. The AI-based system may classify attributes without manual intervention and provide the flexibility to automate design for any BI environment.

AI-based solutions may use the source feed and the corresponding data warehouse target data as inputs and run them against an AI classifier engine. The classifier engine may group both the source and target attributes for more precise and flexible quality management. A customizable rules engine may run the attributes from each category against a set of predefined rules and generate data quality metrics for the entire BI system.

Illustrative aspects of data quality include accuracy, reliability, completeness, precision, timeliness, integrity and confidentiality. Illustrative data quality metrics include ratio of data to errors, number of empty values, data time-to-value, data transformation error rate, and data storage costs.

For the sake of illustration, the invention will be described as being performed by a "system." The system may include one or more features of the apparatus and methods that are described herein and/or any other suitable device or approach.

The system may include one or more raw data sources. The data sources may incorporate structured data, semi-structured data and/or unstructured data. The system may include one or more data warehouses. The data warehouse may store enterprise data integrated from various data sources.

The source data may include one or more attributes. The target data in the data warehouse may include one or more attributes. An attribute may be defined as a database component such as a column in a table. The attributes may be fact attributes or dimension attributes. The attributes may be primary key or foreign key attributes.

The system may include an attribute classifier. The attribute classifier may correlate raw source data in various formats with structured target data from the data warehouse. The attribute classifier may read the data from the source system. The attribute classifier may extract an attribute from the source data set. The attribute classifier may use a data vector generation engine to generate a data vector for the source attribute.

The data vector generation engine may determine the cardinality of the attribute. Cardinality may refer to the uniqueness of the data values stored in a particular column in a database table. Lower cardinality may indicate a greater number of duplicated elements in a column. A column with the lowest possible cardinality would have the same value for every row.

The cardinality of an attribute may determine whether the attribute is tokenized before generating a vector for the attribute. For example, a column including a list of names would have a higher cardinality and the text may be tokenized to enable comparison of text strings. Numbers and user defined attributes may not be subject to tokenizing.

The determination of whether to tokenize an attribute may depend on the cardinality of the source attribute meeting a predetermined threshold. If the cardinality of the attribute meets or exceeds a predetermined threshold, the data vector generation engine may apply an n-gram algorithm to the attribute text strings. N-grams may be sequences of n contiguous items on the incoming string. If the cardinality of the attribute does not meet the predetermined threshold, the system may utilize a direct word comparison algorithm or any other suitable algorithm.

The data vector generation engine may generate a normalized term frequency (TF). TF may be calculated according to Equation 1, below:

$$tf(t,d) = N(t,d)/\|D\| \qquad \text{Eq. 1:}$$

Equation 1 determines TF for term t and records d, where N is the number of occurrences of term t in the record set. Using Equation 1, if a term (or a tokenized fragment) appears 4 times in 100 records, the TF would be equal to 0.04 (4/100).

The data vector generation engine may generate an inverse document frequency (IDF). IDF may be calculated according to Equation 2, below:

$$idf(t) = \log(N/df(t)) \qquad \text{Eq. 2:}$$

Equation 2 determines IDF for term t, where N is the total number of records and df(t) is the frequency of term t. As defined by Equation 2, IDF(t) is log_e (total number of records/number of records containing the term t). If a term appears 1000 times in 10 million records, the IDF would be equal to 4 (log_e(10M/1000)).

The data vector generation engine may calculate a TD-IDF vector for an attribute by multiplying the TD and IDF of the attribute or by performing any suitable operations.

The attribute classifier may generate a unique TD-IDF source vector for each attribute in the source data set using the data vector generation engine. The attribute classifier may generate a unique TF-IDF target vector for each attribute in the target data set using the data vector generation engine. The target system may be an enterprise data warehouse.

The attribute classifier may compare a source vector against each of the target vectors. The attribute classifier may use Cosine Similarity/Euclidean Distance or any suitable distance algorithm to compare the vectors.

For each source attribute, the attribute classifier may determine a set of target attributes with the highest probability of correspondence. In some embodiments the attribute classifier may extract the top three target attributes.

The system may include a data quality engine. The data quality engine may read the attribute data from the attribute classifier. The data quality engine may determine if the attribute is a source attribute or a target attribute.

If the attribute is a source attribute, the data quality engine may determine whether the source attribute is used by enterprise systems. If the source attribute was classified as having a probable correspondence to a target attribute, the source attribute is determined to be used in the data warehouse. If the source attribute does not correspond to any target attributes, then the source attribute is not being used for enterprise business intelligence purposes.

Unused attributes indicate enterprise spending on data that is not relevant for business intelligence. The system may generate an unused attribute report, cataloging source attributes that are unused.

The system may generate data quality metrics for used source attributes. For example, source attributes may be evaluated for completeness, by determining null validations. Data quality metrics may validate the source attribute for compliance with business rules.

The data quality engine may identify input data as a target attribute. Target attributes may be classified based on their degree of correspondence to source attributes. A first category of target attributes may each correlate completely with a source attribute. These direct load attributes have a 100% probability of correspondence. If the direct load target attribute is a dimension, the data quality engine may generate data quality metrics based on the rules for dimensions. If the direct load target attribute is a fact, the data quality engine may generate data quality metrics based on the rules for facts.

A second category of target attributes may include transformations that only partially correlate with source attributes. Transformed target attributes have less than 100% probability of correspondence. If the transformed target attribute is a dimension, the data quality engine may generate data quality metrics based on the rules for dimensions. If the transformed target attribute is a fact, the data quality engine may generate data quality metrics based on the rules for facts.

A third category of target attributes may be primary keys and foreign keys. A foreign key may also be known as a reference key. The system may use metadata matches to identify primary keys and foreign keys. If the target attribute is a primary key or foreign key, the data quality engine may generate data quality metrics based on the rules for these keys.

The rules applied to generate data quality metrics for each attribute classification may be predefined. The predefined rules may be customized for given attribute classifications on an ongoing basis.

The system may include a user interface. The user interface may include a browser-based front end for keying in values. The user interface may automatically map the source feeds to the corresponding target system.

The user interface may enable a user to enter source details, target details, and metadata for the data warehouse environment. A user may use the interface to specify parameters of the TD-IDF vectorization. For example, a user may adjust the determination of cardinality to change the percentage of distinct values for an attribute that triggers tokenization prior to vectorization. The user may specify the number of characters in each n-gram. The user may specify the total number of records to be considered for the determinations of TF or IDF.

One or more non-transitory computer-readable media storing computer-executable instructions are provided. When executed by a processor on a computer system, the instructions perform a method for AI based generation of data quality metrics for an enterprise data warehouse.

The method may include generating a source vector from each source attributes obtained from one or more data sources and a target vector from each target attribute in a set of target attributes. The set of target attributes may include data from one or more data sources that has been integrated into enterprise data warehouse structure.

The method may include determining a probability of correspondence between a source vector and each of the target vectors from the target data set.

The method may include classifying a source attribute based at least in part on the probability of correspondence between the source vector generated from the source attribute and a target vector. The method may include classifying a target attribute based at least in part on the probability of correspondence between a source vector and the target vector.

The method may include generating data quality metrics for the source attribute and the target attribute based at least in part on the classifications. The method may include validating the source attribute data and the target attribute data using the data quality metric.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ('I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of attribute classification, generation of attribute vectors, generation of data quality metrics data validation, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
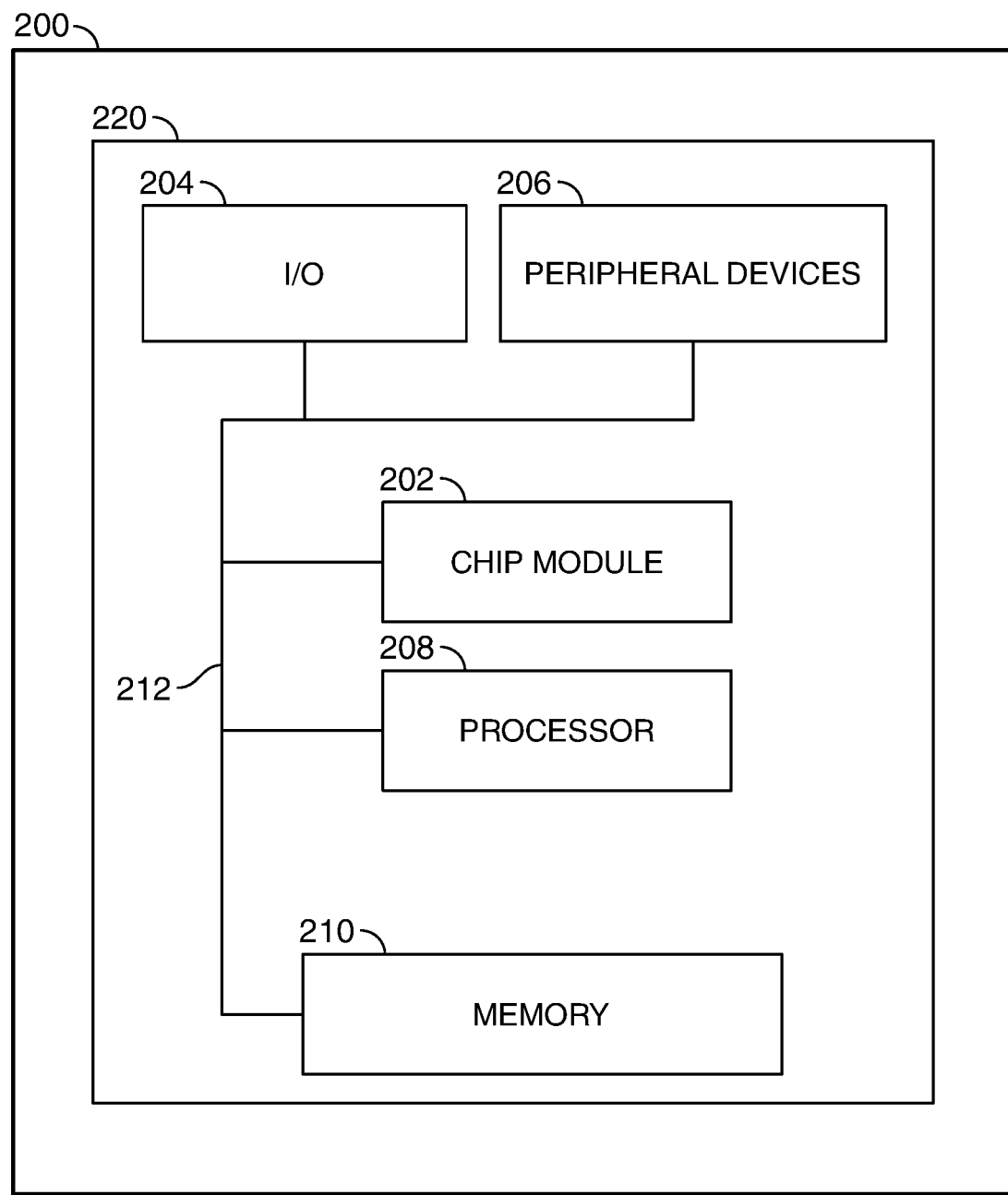
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute source attribute vectors, target attribute vectors, match probabilities, and perform other methods described herein; and machine-readable memory 210.

Machine-readable memory 210 may be configured to store in machine-readable data structures: target attribute sets, source attribute sets, source vectors, target vectors, probable matches, attribute classification, rules for different classifications, data quality metrics, validation results and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
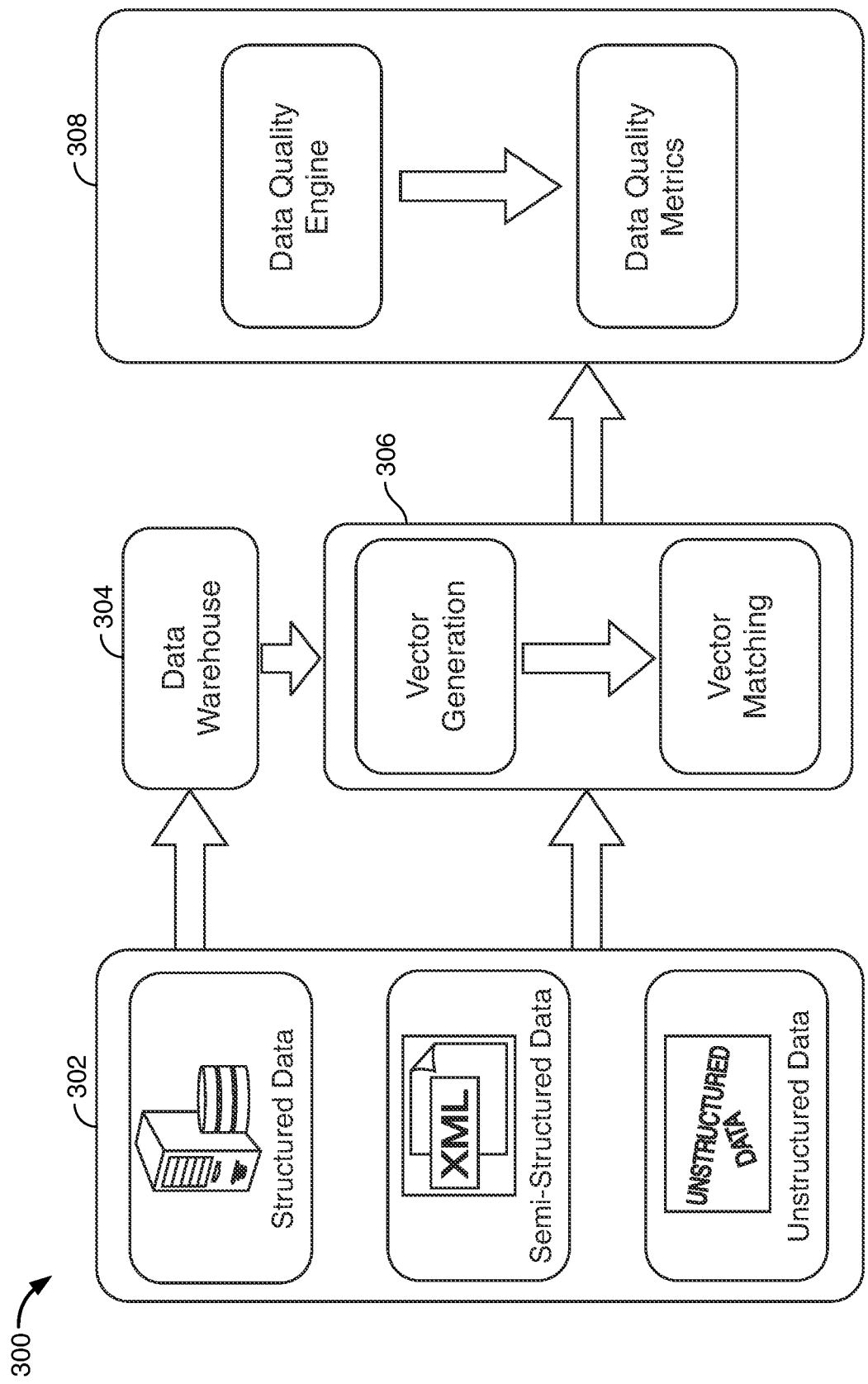
FIG. 3 shows illustrative system architecture in accordance with principles of the disclosure.

FIG. 3 shows high-level system overview 300. Sources 302 regularly provide raw source data for data warehouse 304. Sources 302 may include a variety of different data architectures. Data warehouse 304 may integrate the raw source data into a highly structured format according to enterprise standards.

Attribute classifier 306 receives source attributes from sources 302 and target attributes from data warehouse 304. Attribute classifier 306 may generate TD-IDF vectors for each source attribute and target attribute. Attribute classifier 306 may match the source attributes to the target attributes based on the correspondence between the vectors.

Data quality manager 308 may receive the attributes and attribute classification data from attribute classifier 306. Based on the data from the attribute classifier, a data quality engine may identify whether source attributes are used or unused and whether target attributes are identical to the source data, transformed from the source data or functioning as primary or reference keys. The data quality engine may determine whether identical and transformed target attributes are facts or dimensions. The data quality engine may generate data quality metrics that are customized for each attribute classification. The data quality engine may validate the attributes using the data quality metrics.

Figure 4:
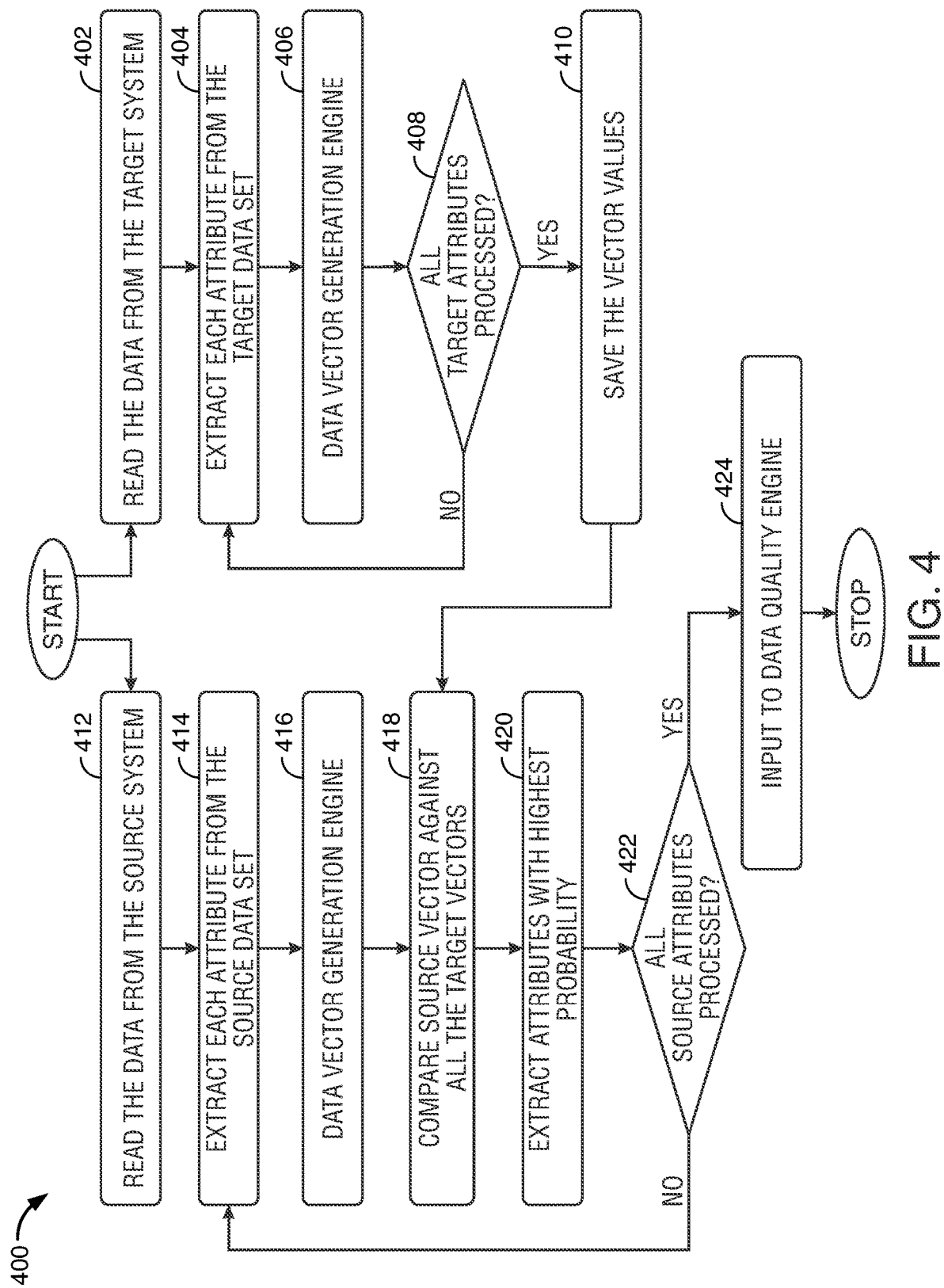
FIG. 4 shows an illustrative process flow in accordance with principles of the disclosure.

FIG. 4 shows illustrative process flow 400 for an attribute classifier. Steps 402-410 show processing of target attributes. At step 402, the attribute classifier reads data from the target system. The target system may be an enterprise data warehouse. At step 404, the attribute classifier extracts each attribute from the target data set. At step 406, the data vector generation engine generates a vector for each of the target attributes. The data vector generation engine is shown in more detail in FIG. 5. At step 408, the process iterates until the desired number of target attributes are processed. At step 410, the attribute classifier saves the target vector values for use in step 418.

Steps 412-424 show processing of source attribute data. At step 412, the attribute classifier reads data from the source system. At step 414, the attribute classifier extracts each attribute from the source data set. At step 416 a data vector generation engine generates a vector for each of the source attributes. The data vector generation engine is shown in more detail in FIG. 5. At step 418, the attribute classifier compares a source vector against all target vectors. The comparison may use cosine similarity and Euclidean distance or any suitable method. At step 420 a set of target vectors with the highest probability of a match to the source attribute are extracted. At step 422, the process iterates until the desired number of source attributes are processed. At step 424, results from the attribute classifier are input to a data quality engine. The data quality engine is shown in more detail in FIG. 6.

Figure 5:
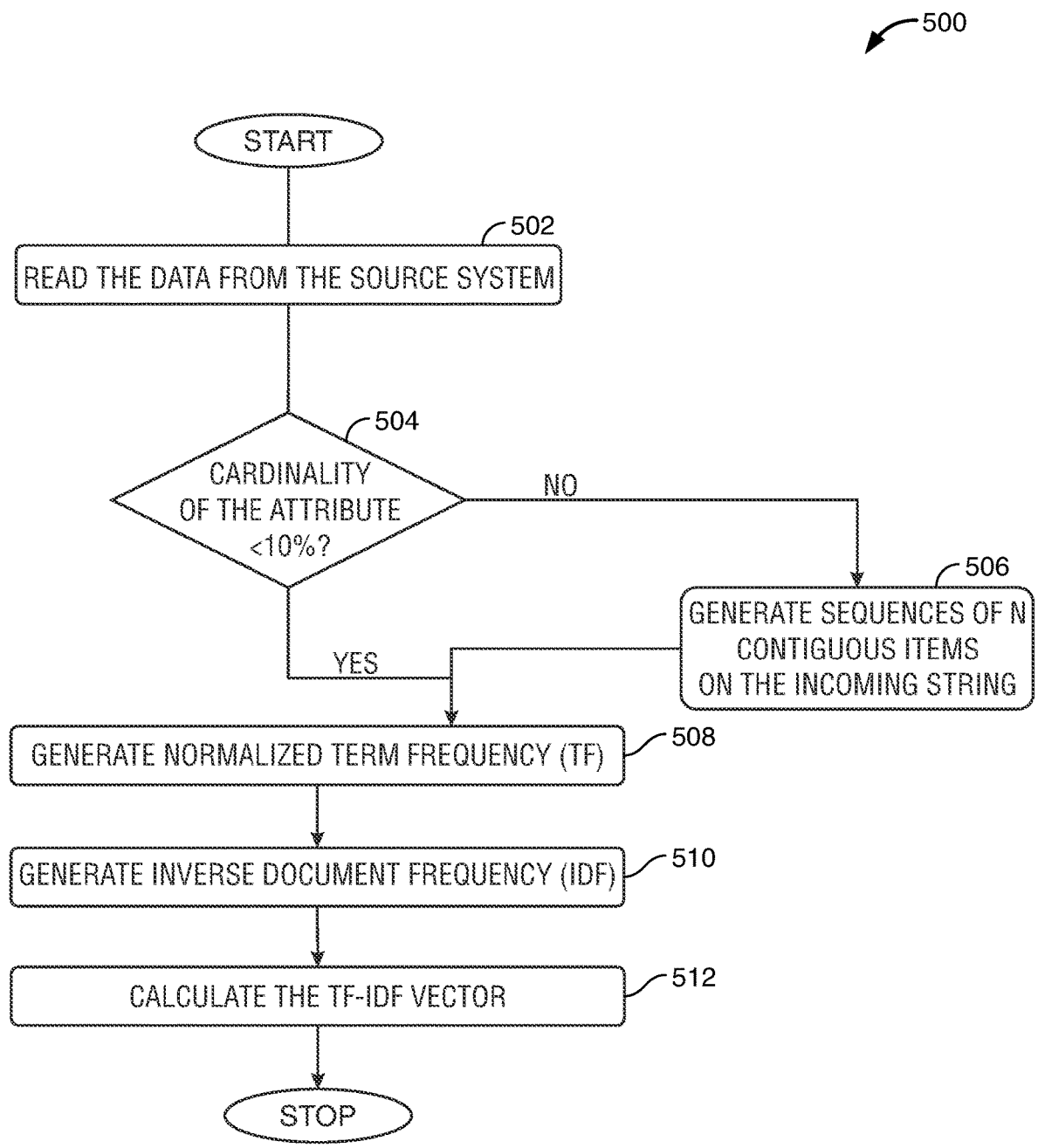
FIG. 5 shows an illustrative process flow in accordance with principles of the disclosure.

FIG. 5 shows illustrative process flow 500 for a data vector generation engine. One or more elements of process flow 500 may overlap with elements of process flow 400, shown in FIG. 4.

Process flow 500 shows generation of a TD-IDF vector, but any suitable vector may be used. Process flow 500 shows processing of a source attribute, but the process may also be applied to target attributes, as shown in FIG. 4 at step 406.

At step 502, the data vector generation engine reads attribute data from the source system. At step 504, the cardinality of the attribute is determined. If the cardinality of the attribute meets a predetermined threshold, the process continues at step 506. If the cardinality of the attribute is below a predetermined threshold, step 506 may be skipped, and the process continues at step 508. At step 506, the data vector generation tokenizes the attribute by breaking the content into sequences of n contiguous items. At step 508, the data vector generation engine generates a normalized term frequency (TF). At step 510, the data vector generation engine generates an inverse document frequency (IDF). At step 512, the data vector generation engine calculates a TD-IDF vector for the source attribute.

Figure 6:
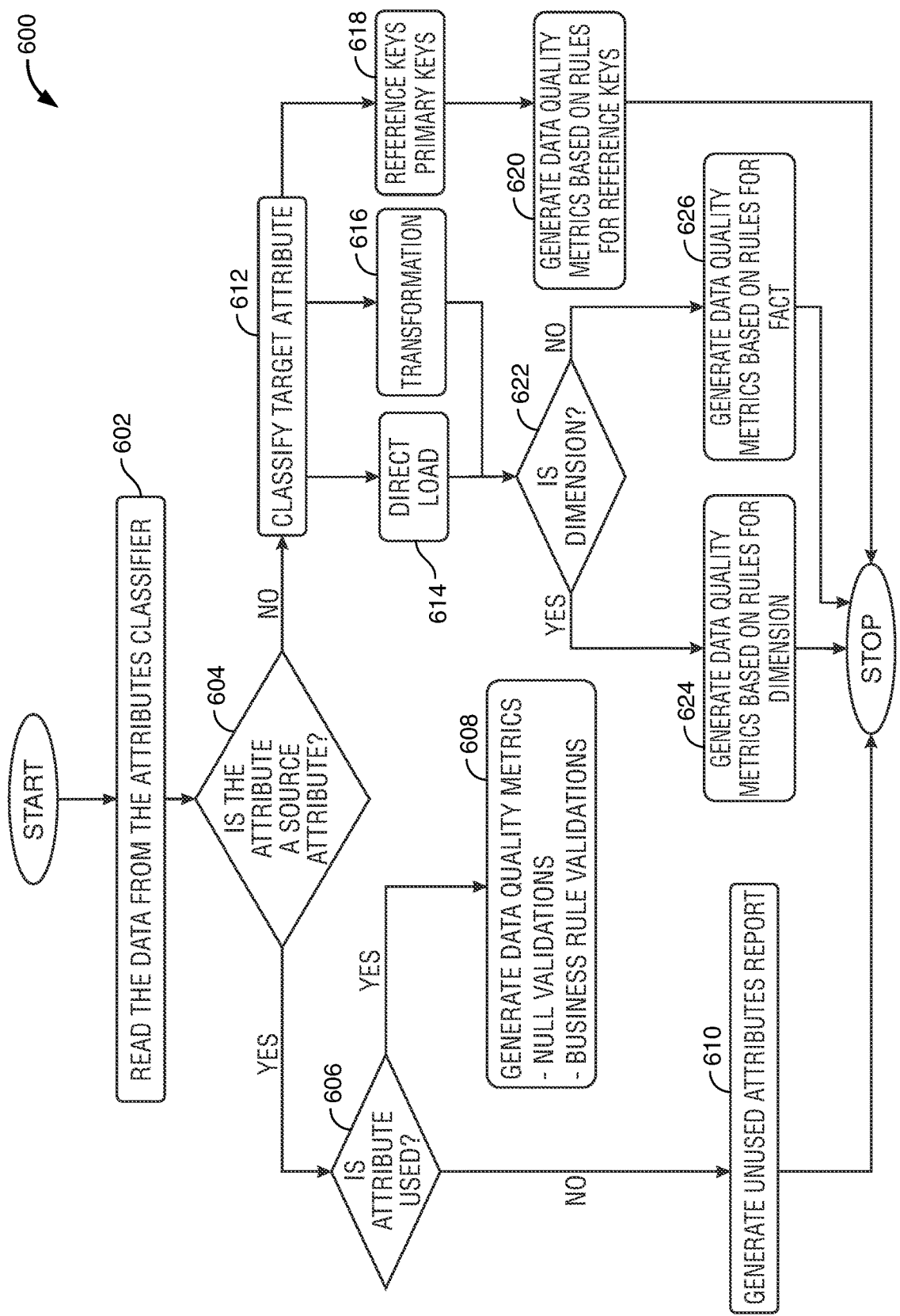
FIG. 6 shows an illustrative process flow in accordance with principles of the disclosure.

FIG. 6 shows illustrative process flow 600 for a data quality engine. One or more elements of process flow 600 may overlap with elements of process flow 400, shown in FIG. 4, and process flow 500, shown in FIG. 5.

At step 602 the data quality engine reads the data from the attribute classifier. At step 604, the data quality engine determines whether an attribute is a source attribute or target attribute. If the attribute is a source attribute, the process continues with steps 606 through 610. If the attribute is a target attribute, the process continues with steps 612-626.

At step 606, the data quality engine determines if the attribute is used. The determination is based on the probability of a match to a target attribute determined by the attribute classifier. If there is a zero probability indicating no match to structures in the data warehouse, the attribute is determined to be unused.

If the attribute is unused, the process continues at step 610. At step 610, the data quality engine generates an unused attribute report. If the attribute is used, the process continues at step 608. At step 608 the data quality engine generates data quality metrics for the source attribute. Illustrative data quality metrics include null validations to check for completeness and business rule validations to check for compliance with enterprise standards.

If the attribute is a target attribute, at step 612, the data quality engine buckets the target attribute based on its relationship to the source attribute. At step 614, the target attribute entirely matches the source attribute and is bucketed as a direct load. At step 616, the target attribute is related to the source attribute, but has undergone some transformation. These attributes have a percentage match to the source attribute that is less than 100% and are bucketed as transformations. At step 618, the target attribute is identified as reference key or primary key. At step 620, the data quality engine generates data quality metrics based on the rules for reference keys.

If the target attribute is determined to be a direct load or a transformation, the process continues at steps 622-626. At step 622 the data quality engine determines whether the direct load attributes and the transformation attributes are dimensions or facts. If the attribute is a dimension, the process continues at step 624. At step 624, the data quality engine generates data quality metrics based on rules for dimensions. If the attribute is not a dimension, the process continues at step 626. At step 626, the data quality engine generates data quality metrics based on rules for facts.

Thus, methods and apparatus for SMART DATA QUALITY PROTOCOLS are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for smart generation of data warehouse quality protocols, the system comprising:
   a data source comprising a set of source attributes having a first data structure;
   a data warehouse comprising target data obtained from one or more data sources, the target data comprising a set of target attributes, the target attributes having a second data structure and comprising a transformation of the source attributes;
   a processor comprising an artificial intelligence ("AI") model and configured to:
      generate a source vector from each source attribute in the set of source attributes;
      generate a target vector from each target attribute in the set of target attributes; and
      determine a probability of correspondence between the source vector and each of the target vectors for input to the AI model;
   using the AI model:
      determine whether one of the target attributes is a transformation of a source attribute based at least in part on a probability of correspondence between the source vector generated from the source attribute and one of the target vector generated from the target attribute;
      output a data quality metric for the source attribute based at least in part on a first parameter of the transformation;
      output a data quality metric for the target attribute based at least in part on a second parameter of the transformation; and
      validate the source attribute and the target attribute using the data quality metrics, wherein the data quality metrics comprise a ratio of data to errors and a number of empty values.

2. The system of claim 1, wherein the processor is further configured to:
   determine a cardinality for an attribute;
   when the cardinality of the attribute meets a predetermined threshold, use an n-gram algorithm to generate a vector for the attribute; and
   when the cardinality of the attribute does not meet the predetermined threshold, use a direct word comparison algorithm to generate a vector for the attribute.

3. The system of claim 1, wherein the processor is further configured to:

determine a term frequency for an attribute;
determine an inverse document frequency for an attribute; and
determine an attribute vector based at least in part on the term frequency and the inverse document frequency.

4. The system of claim 1, further comprising determining whether a source attribute is used or unused, the determination based on a relationship between the target vector and the source vector, wherein a source attribute is unused when a probability of correspondence between the source vector generated from the source attribute and each of the target vectors is below a predetermined threshold.

5. The system of claim 1 further comprising a user interface, the user interface configured to receive input of a source attribute data set and a target attribute data set.

6. The system of claim 5, wherein:
the AI model outputs the data quality metric based on one or more predefined rules for an attribute classification; and
the user interface is further configured to receive input modifying a predefined rule.

7. One or more non-transitory computer-readable media storing computer-executable instructions which, when executed by a processor on a computer system, perform a method for artificial intelligence ("AI") based generation of data warehouse quality protocols, the method comprising:
generating a source vector from each source attribute in a set of source attributes, the set of source attributes obtained from one or more data sources and comprising a first data structure;
generating a target vector from each target attribute in a set of target attributes, the target attributes comprising target data obtained from one or more data sources and integrated into a data warehouse, and comprising a second data structure;
determining a probability of correspondence between the source vector and each of the target vectors;
identifying a transformation from the first data structure to the second data structure based at least in part on a probability of correspondence between the source vector generated from the source attribute and one of the target vectors, and classifying the source attribute;
generating a data quality metric for the source attribute based at least in part on the source attribute classification;
identifying a transformation from the first data structure to the second data structure based at least in part on a probability of correspondence between the source vector and the target vector, and classifying the target attribute;
generating a data quality metric for the target attribute based at least in part on the target attribute classification; and
validating the source attribute and the target attribute using the data quality metrics, wherein the data quality metrics comprise a ratio of data to errors and a number of empty values.

8. The media of claim 7, wherein classifying an attribute further comprises:
determining a term frequency for an attribute;
determining an inverse document frequency for an attribute; and
determining an attribute vector based at least in part on the term frequency and the inverse document frequency.

9. The media of claim 7, wherein classifying the target attribute comprises determining whether the target attribute comprises a transformation of the source attribute, the determination based on a relationship between the target vector and the source vector.

10. The media of claim 7, wherein classifying the source attribute comprises determining whether the source attribute is used or unused, the determination based on a relationship between the target vector and the source vector, wherein a source attribute is unused when a source vector generated from the source attribute has no probability of correspondence to any of the target vectors.

11. The media of claim 7, further comprising receiving selection of a source attribute data set and a target attribute data set via a user interface.

12. The media of claim 11, further comprising:
generating the data quality metric based on one or more predefined rules for an attribute classification; and
receiving a modification of a predefined rule via the user interface.

13. The media of claim 7, wherein the source attribute comprises semi-structured or unstructured data and the target attribute comprises structured data.

14. A method for artificial intelligence ("AI") based generation of data warehouse quality protocols, the method comprising:
generating a source vector from each source attribute in a set of source attributes, the set of source attributes obtained from one or more data sources;
generating a target vector from each target attribute in a set of target attributes, the target attributes comprising target data obtained from one or more data sources and integrated into a data warehouse;
determining a probability of correspondence between the source vector and each of the target vectors;
using an AI model:
determining that a target attribute is a transformation of a source attribute based at least in part on a probability of correspondence between the source vector generated from the source attribute and one of the target vectors, and classifying the source attribute based on the transformation;
outputting a data quality metric for the source attribute based at least in part on the source attribute classification;
determining that a target attribute is a transformation of a source attribute based at least in part on a probability of correspondence between the source vector and the target vector, and classifying the target attribute based on the transformation;
outputting a data quality metric for the target attribute based at least in part on the target attribute classification; and
validating the source data set and the target data set using the data quality metrics, wherein the data quality metrics comprise a ratio of data to errors and a number of empty values.

15. The method of claim 14, further comprising:
determining a term frequency for an attribute;
determining an inverse document frequency for an attribute; and
determining an attribute vector based at least in part on the term frequency and the inverse document frequency.

16. The method of claim 14, further comprising receiving a selection of a source attribute data set and a target attribute data set via a user interface.

17. The method of claim 16, further comprising:
generating the data quality metric based on one or more predefined rules for an attribute classification; and receiving a modification of one or more of the rules via the user interface.

18. The method of claim 14, wherein the source attribute comprises semi-structured or unstructured data and the target attribute comprises structured data.

\* \* \* \* \*